United States Patent
Kim et al.

(10) Patent No.: US 10,854,343 B2
(45) Date of Patent: Dec. 1, 2020

(54) NUCLEAR FUEL ASSEMBLY FOR A THERMAL NEUTRON REACTOR

(71) Applicant: KOREA ADVANCED INSTITUTE OF SCIENCE AND TECHNOLOGY, Daejeon (KR)

(72) Inventors: Yonghee Kim, Daejeon (KR); Chihyung Kim, Daejeon (KR); Jeong Ik Lee, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 584 days.

(21) Appl. No.: 15/858,462

(22) Filed: Dec. 29, 2017

(65) Prior Publication Data

US 2018/0190394 A1 Jul. 5, 2018

(30) Foreign Application Priority Data

Dec. 30, 2016 (KR) .......................... 10-2016-0183486

(51) Int. Cl.
*G21C 9/02* (2006.01)
*G21C 7/04* (2006.01)
*G21C 7/08* (2006.01)

(52) U.S. Cl.
CPC .............. *G21C 9/022* (2013.01); *G21C 7/04* (2013.01); *G21C 7/08* (2013.01); *Y02E 30/30* (2013.01)

(58) Field of Classification Search
CPC ... G21C 7/02; G21C 7/04; G21C 9/02; G21C 9/022
See application file for complete search history.

(56) References Cited

U.S. PATENT DOCUMENTS

| | | | | | |
|---|---|---|---|---|---|
| 3,223,589 | A | * | 12/1965 | Ziegler | G21C 7/16 376/219 |
| 3,290,221 | A | * | 12/1966 | Gorker | G11C 11/08 376/210 |
| 3,375,170 | A | * | 3/1968 | Stubley | G21C 7/16 376/230 |
| 2010/0296620 | A1 | * | 11/2010 | Peterson | G21C 3/30 376/330 |

FOREIGN PATENT DOCUMENTS

| | | |
|---|---|---|
| JP | 05119179 | 5/1993 |
| KR | 10-2008-0027046 | 3/2008 |
| KR | 10-1549603 | 9/2015 |
| KR | 10-1556758 | 10/2015 |

* cited by examiner

*Primary Examiner* — Sharon M Davis
(74) *Attorney, Agent, or Firm* — Klarquist Sparkman, LLP

(57) ABSTRACT

The present invention relates to a nuclear reactor, more precisely a passive safety device applicable to a thermal neutron reactor and a nuclear fuel assembly equipped with the same. The nuclear fuel assembly for a thermal neutron reactor of the present invention includes multiple fuel rods; multiple guide thimbles arranged between the fuel rods; and a passive safety device including neutron absorber parts which are inserted in one or more guide thimbles.

11 Claims, 6 Drawing Sheets

NUCLEAR FUEL ASSEMBLY FOR A THERMAL NEUTRON REACTOR

CROSS REFERENCE TO RELATED APPLICATION

This application claims priority to KR Patent Application No. 10-2016-0183486, filed on Dec. 30, 2016. The disclosure of that prior filed application is incorporated herein by reference.

BACKGROUND OF THE INVENTION

1. Field of the Invention

The present invention relates to a nuclear reactor, more precisely a passive safety device applicable to a thermal neutron reactor and a nuclear fuel assembly equipped with the same.

2. Description of the Related Art

A nuclear reactor is basically a device using the energy generated from the neutron fission. Neutrons are divided into low-energy thermal neutrons and high-energy fast neutrons according to energy. Accordingly, a nuclear reactor is also divided into a thermal neutron reactor using the thermal neutrons and a fast reactor using the fast neutrons. In general, fast neutrons are mostly generated by nuclear fission.

In the thermal neutron reactor, the fast neutrons are slowing down by using a moderator to be used for nuclear fission. In the meantime in the fast reactor, the fast neutrons are used for nuclear fission without slowing down, and at this time a liquid metal with a very low moderating capability such as sodium (Na) is used as a coolant.

Reactors have reactivity feedback effects due to various temperatures such as moderator temperature, nuclear fuel temperature, and coolant temperature. These feedback effects allow the reactor to mitigate and stabilize various accidents related to temperature by itself. A nuclear fuel has a negative reactivity feedback effect at the conventional temperature, which is due to the Doppler broadening effect, in which neutron absorption in the so-called resonance region is increased as the temperature rises.

In the general thermal neutron reactor, water is used as a moderator or a coolant. So, most of the energy of neutrons is transferred to water, so that fast neutrons turn into thermal neutrons. When the temperature of a coolant or a moderator rises in the thermal neutron reactor for any reason, various phenomena occur. In particular, the neutron spectrum hardening causes the average energy of neutrons to become higher. This is because the density of the moderator decreases as the temperature of the nuclear reactor increases and the decelerating ability is lowered, so that the neutron energy is higher than before the temperature rise. Since the fast neutron usually has a smaller fission cross section than the thermal neutron, the spectrum hardening results in the reduction of reactivity in the thermal neutron reactor. By this phenomenon, the moderator temperature coefficient of reactivity in the thermal neutron reactor is usually negative.

If there is a problem during the operation of a nuclear reactor, the coolant pump or the steam generator might be out of order and accordingly the temperature of the nuclear reactor can rise excessively. At this time, the negative feedback effects can mitigate the rise of the reactor power and alleviate the problems that arise. Nevertheless, the deterioration of nuclear reactor materials and nuclear fuel integrity due to the excessive temperature rise is inevitable.

As a result of continued study, the present inventors developed a passive safety device that can realize an additional negative reactivity passively inserted in addition to the inherent negative reactivity feedback effect in the nuclear reactor when an incident happens due to the coolant temperature rise and they have further developed a nuclear fuel assembly including the same.

SUMMARY OF THE INVENTION

To achieve reactor stability it is important to have a negative reactivity feedback effect in addition to the reactivity feedback effect inherent to the reactor in relation to the temperature of the coolant, thereby stabilizing the reactor itself in the event of an accident. So, it is an object of the present invention to provide a nuclear fuel assembly equipped with a novel passive safety device that can realize a stable and safe operation of a nuclear reactor and can be equipped to any conventional nuclear reactor without a large change in the plan of the nuclear reactor.

The nuclear fuel assembly for a thermal neutron reactor of the present invention includes multiple fuel rods; multiple guide thimbles arranged between the fuel rods; and a passive safety device including neutron absorber parts which are inserted in one or more guide thimbles. The nuclear fuel assembly for a thermal neutron reactor may further comprise control rods inserted in one or more guide thimbles.

According to an embodiment of the present invention, the passive safety device includes: a passive safety device guide tube formed with one or more coolant inflow/outflow holes going through the inner and outer spaces; and a buoyancy providing part disposed in the inner space of the passive safety device guide tube so as to be movable up and down therein and including the neutron absorber.

According to an embodiment of the present invention, the passive safety device can additionally include a passive safety device guide tube connection part to connect those multiple passive safety device guide tubes one another.

According to an embodiment of the present invention, the passive safety device guide tube connection part above can be formed on the multiple passive safety device guide tubes above.

According to an embodiment of the present invention, the density of the buoyancy providing part containing the neutron absorber is less than the coolant density during the normal operation of the thermal neutron reactor and is higher than the coolant density during the transient state operation of the thermal neutron reactor.

According to an embodiment of the present invention, the buoyancy providing part can include a neutron absorber-containing part and a buoyancy providing material-containing part.

According to an embodiment of the present invention, the buoyancy providing material can be selected from the group consisting of air, helium, and argon.

According to an embodiment of the present invention, the neutron absorber can include one of or both of boron and gadolinium.

According to an embodiment of the present invention, the neutron absorber can be porous.

According to an embodiment of the present invention, the coolant can be water (H2O).

According to an embodiment of the present invention, one or more coolant inflow/outflow holes can be formed either or both of the upper part and the lower part of the passive safety device guide tube.

Advantageous Effect

The passive safety device of the present invention can be installed in the conventional nuclear reactor without a large design change to induce the negative reactivity feedback effect. Due to this device, when the coolant temperature rises, the negative reactivity feedback effect is induced automatically without any special operation. Further, when the loss of the coolant occurs, the negative reactivity feedback effect can be obtained automatically by gravity.

BRIEF DESCRIPTION OF THE DRAWINGS

The application of the preferred embodiments of the present invention is best understood with reference to the accompanying drawings, wherein:

FIG. 2B illustrates the guide thimbles into which control rods are inserted.

DESCRIPTION OF THE PREFERRED EMBODIMENTS

Hereinafter, examples will be described in more detail with the attached drawings. The same reference symbol shown in each drawing indicates the same member.

The following examples can be modified in various manners. It is to be understood that the examples described below are not intended to limit the embodiments but include all modifications, equivalents, and alternatives to them.

The terms used in the examples of the invention are used to help the understanding of a specific example and cannot limit the present invention to those examples. The term in a singular form can also include the plural form in the text, unless stated otherwise. In this description, the term "include" or "have" indicates that specific characteristics, numbers, steps, operations, components, parts or the assembly of those can be allowed and does not exclude any possibility of additional attachment or assembly of other one or more characteristics, numbers, steps, operations, components, and parts.

Unless indicated otherwise, all the terms including technical terms or scientific terms are understood as generally understood by those in the art who has the common knowledge in this field. The terms defined by the general dictionary have to be understood in the related technical text meaning. Unless defined clearly in this description, the terms are not interpreted as ideally or too formally.

In the description of the attached drawings, the same reference symbol is given to the same factors, and therefore the same explanation is not repeated. In the following description of the embodiments of the present invention, a detailed description of related arts can be omitted when it is determined that the gist of the embodiments can be unnecessarily obscured.

The present invention provides a nuclear fuel assembly in which guide thimbles can be inserted between fuel rods, and control rods or the passive safety device provided by a preferred embodiment of the present invention can be inserted in the guide thimble.

Figure 1:
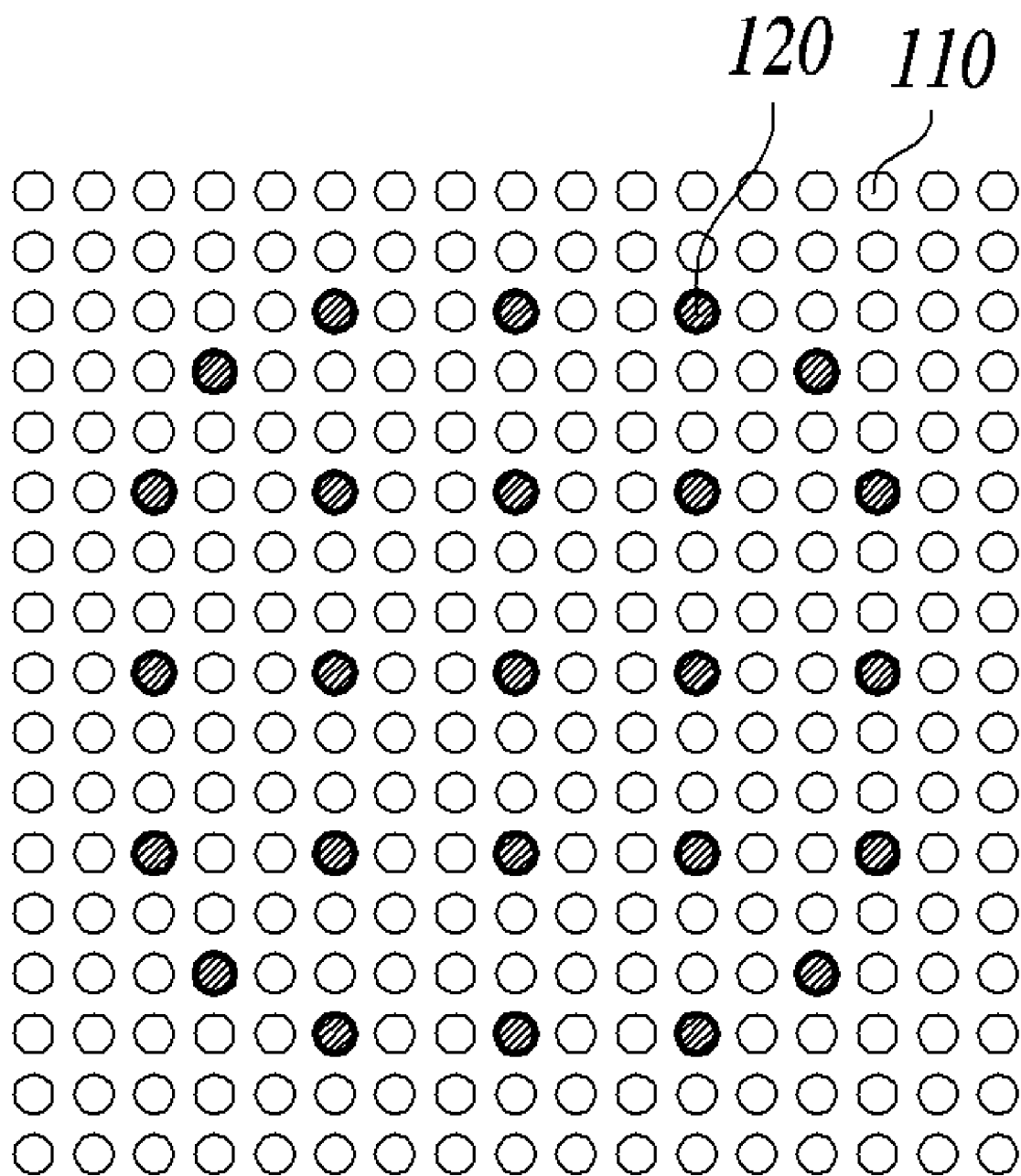
FIG. 1 is a sectional view illustrating the nuclear fuel assembly according to an embodiment of the present invention.

FIG. 1 is a sectional view illustrating the nuclear fuel assembly according to an embodiment of the present invention. The nuclear fuel assembly according to FIG. 1 can be used in a pressurized light water reactor. In the nuclear fuel assembly, multiple fuel rod sites 110 are arranged and multiple guide thimble sites 120 are also arranged between the fuel rod sites. The structure layout shown in FIG. 1 includes 25 guide thimble sites, but it is just an example of the nuclear fuel assembly and the number and arrangement of the fuel rod and guide thimble sites can be changed according to the design of the nuclear fuel assembly.

The nuclear fuel assembly for a thermal neutron reactor of the present invention includes multiple fuel rods; multiple guide thimbles arranged between the fuel rods; and a passive safety device including neutron absorber parts which are inserted in one or more guide thimbles.

Figure 2A:
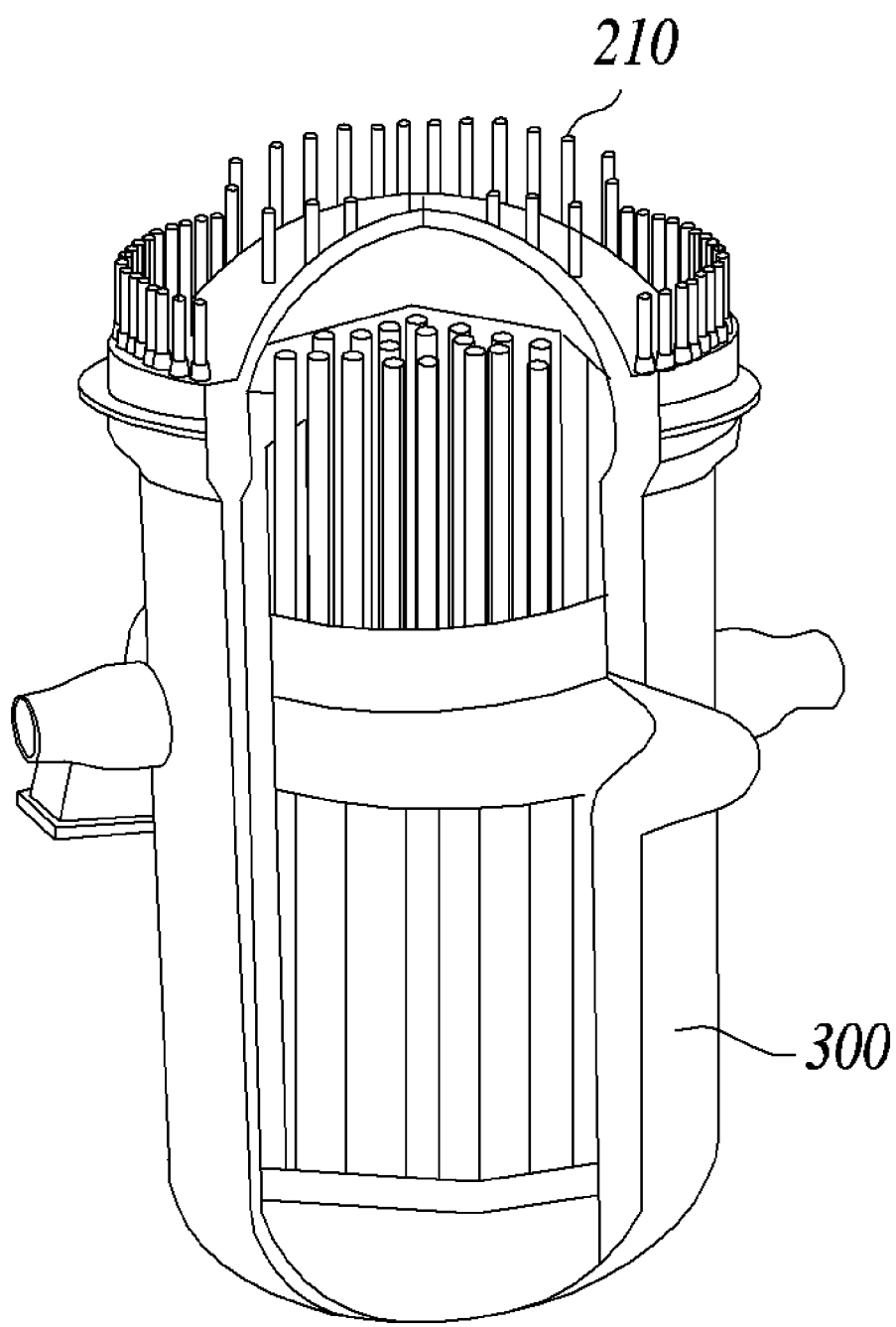
FIGS. 2A and 2B are a set of schematic diagrams, wherein a FIG. 2A illustrates the nuclear fuel assembly according to an embodiment of the present invention
Figure 2B:
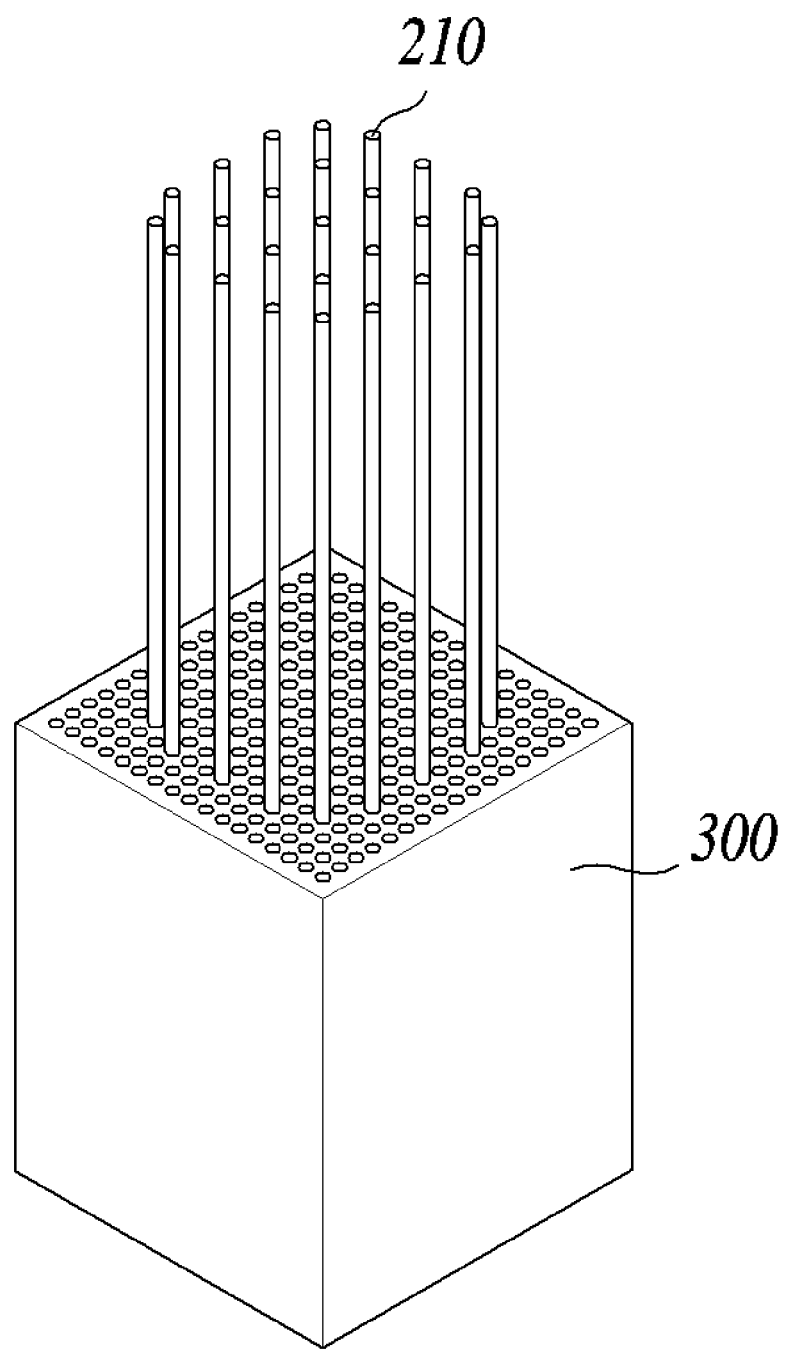

FIGS. 2A and 2B are a set of schematic diagrams, wherein a schematic diagram 2A illustrates the nuclear fuel assembly according to an embodiment of the present invention and a schematic FIG. 2B illustrates the guide thimbles into which control rods are inserted.

The nuclear fuel assembly shown in FIG. 2A has a structure composed of an active core 300 where fuel rods are located downward, and control rods and guide thimbles 210 where the control rods are inserted upward. In FIG. 2B, the structure of the guide thimble 210 into which the control rod is inserted, formed in a part of the 25 sites for the guide thimble of FIG. 1, can be confirmed. According to an aspect of the present invention, the guide thimble may be the control rod guide thimble used in a conventional thermal neutron reactor.

As shown in FIG. 2B, the passive safety device provided in a preferred embodiment of the present invention can be inserted in the remaining guide thimble in which the control rod is not inserted.

According to an embodiment of the present invention, the passive safety device includes: a passive safety device guide tube formed with one or more coolant inflow/outflow holes going through the inner and outer spaces; and a buoyancy providing part disposed in the inner space of the passive safety device guide tube so as to be movable up and down therein and including the neutron absorber.

The passive safety device of the present invention can have a coolant inflow/outflow hole through which a coolant can inflow and a passive safety device guide tube extending upward and downward which is always filled with the coolant. At this time, one or more coolant inflow/outflow holes can be formed therein. When several coolant inflow/outflow holes are formed, they can be formed symmetrically with respect to the longitudinal axis of the passive safety device. The coolant above fills the inner space of the passive safety device in order for the buoyancy providing part can move up and down in the passive safety device guide tube by the density difference between the coolant and the buoyancy providing part.

The density of the coolant that flows in the passive safety device through the coolant inflow/outflow hole can be changed by the surrounding temperature. As the density of the coolant changes, the buoyancy providing part including the neutron absorber can move up and down inside the passive safety device guide tube.

The buoyancy providing part of the present invention is not limited to a specific one as long as it can move up and down in the inside of the passive safety device guide tube. The buoyancy providing part can be designed in the form of a can. The buoyancy providing part can include a neutron absorber. The neutron absorber of the present invention is a key component to realize the negative temperature feedback effect when the coolant temperature is increased.

According to an embodiment of the present invention, the passive safety device can additionally include a passive safety device guide tube connection part to connect those multiple passive safety device guide tubes one another.

The passive safety device guide tube may have a structure of extension lengthwise, which allows the inflow of a coolant. The passive safety device guide tube may have a structure extending upward, and may be a structure in which the coolant flows therein. The coolant filled in the nuclear fuel assembly moves when the nuclear fuel assembly is running. Therefore, the passive safety device guide tube can be affected by vibrations due to the movement of the coolant. In a preferred embodiment of the present invention, the passive safety device can additionally include a passive safety device guide tube connection part interconnecting the passive safety device guide tubes to form a stable structure.

According to an embodiment of the present invention, the passive safety device guide tube connection part can be formed on the multiple passive safety device guide tubes above.

Figure 3:
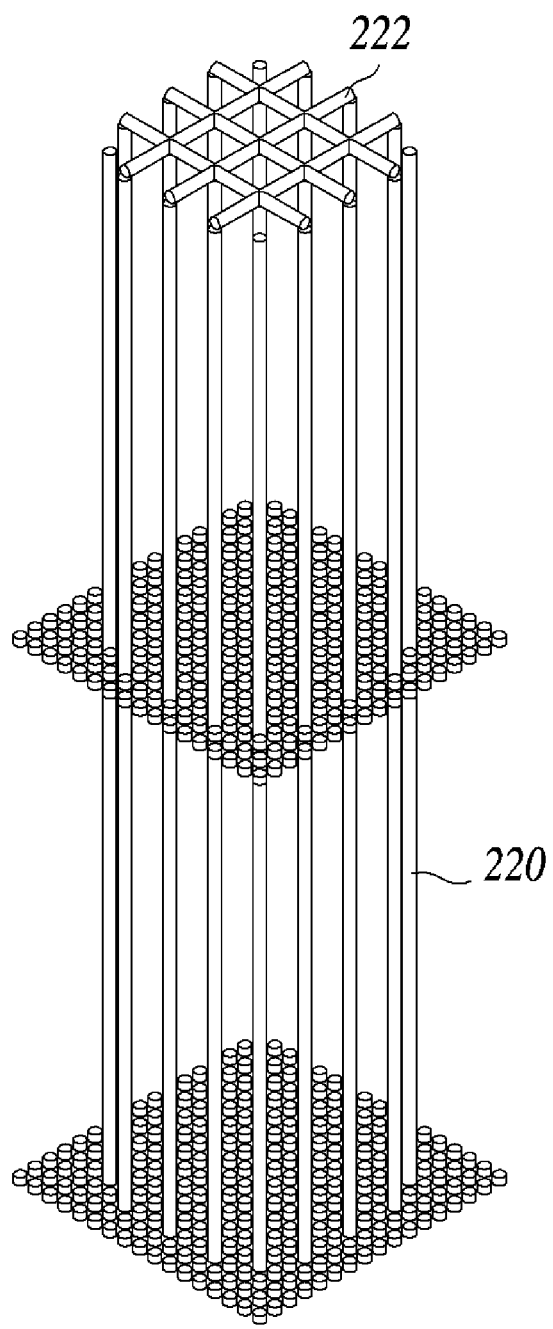
FIG. 3 is a schematic diagram illustrating the structure of the passive safety device guide tube connection part according to an embodiment of the present invention.

FIG. 3 is a schematic diagram illustrating the structure of the passive safety device guide tube connection part according to an embodiment of the present invention.

In FIG. 3, only the passive safety device guide tube 220 is illustrated except the fuel assembly guide thimbles that the passive safety device guide tubes are equipped on. According to an embodiment of the present invention, the passive safety device guide tube connection part 222 can be formed in a structure in which the passive safety device guide tubes are crossed and connected to each other at the upper part of the passive safety device.

According to an embodiment of the present invention, the density of the buoyancy providing part containing the neutron absorber is less than the coolant density during the normal operation of the thermal neutron reactor and is higher than the coolant density during the transient state operation of the thermal neutron reactor.

The density of a material can be changed according to temperature or pressure. The coolant of the present invention is maintained at a relatively low temperature during the normal operation of the reactor and may be exposed to a high temperature during the transient state operation of the reactor. The buoyancy providing part of the present invention is located at the upper part of the passive safety device guide tube in the normal operation of the reactor. When the reactor is in the transient operation state where the temperature of the coolant increases, the buoyancy providing part is going down and sits in the lower part of the passive safety device guide tube.

That is, during normal operation, the density of the coolant is greater than the density of the buoyancy providing part, so that the buoyancy providing part floats to the upper part of the passive safety device guide tube. However, in the transient state, the density of the coolant is less than the density of the buoyancy providing part, so that the buoyancy providing part is sinking to the lower part of the passive safety device guide tube. In the present invention, the transient state indicates that the state of a reactor is out of the nominal state. According to the design of a reactor, various problems can be caused in the course of operation, resulting in the transient state. According to the present invention, in the transient state, the surrounding temperature rises and accordingly the coolant density becomes smaller than the density of the buoyancy providing part. When the buoyancy providing part sinks in the bottom of the passive safety device guide tube, the neutron absorber is positioned in the active core region to absorb the neutrons generated by nuclear fission, and as a result the negative reactivity feedback effect can be induced with reducing the core reactivity.

Figure 4A:
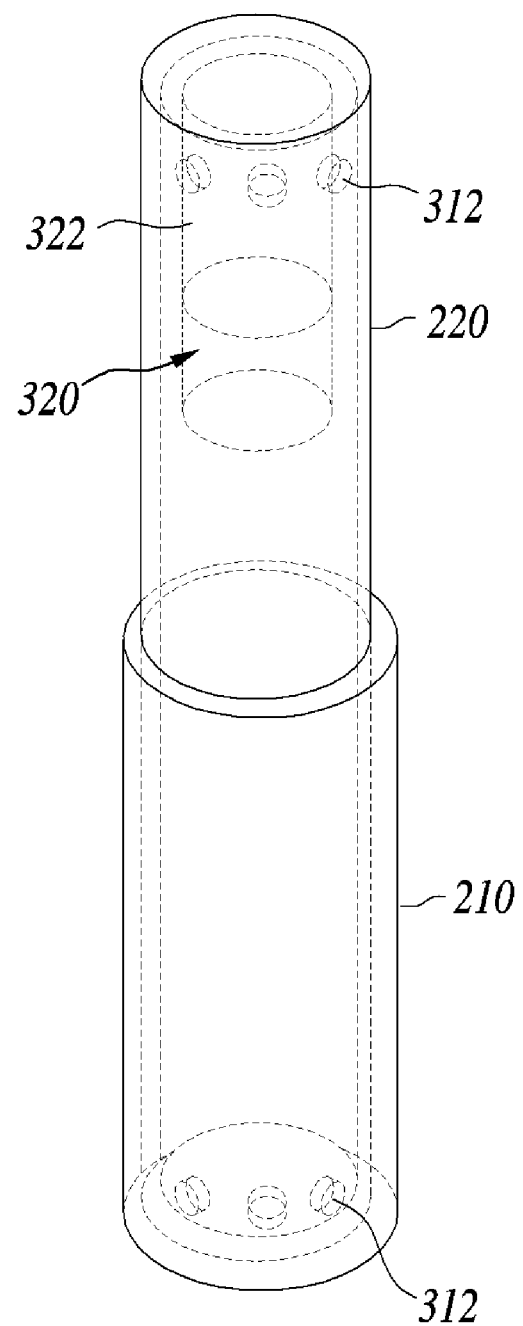
FIGS. 4A and 4B are perspective views of the passive safety device in the steady state operation (FIG. 4A) and in the transient state operation (FIG. 4B) due to an excessive rise of the coolant temperature.
Figure 4B:
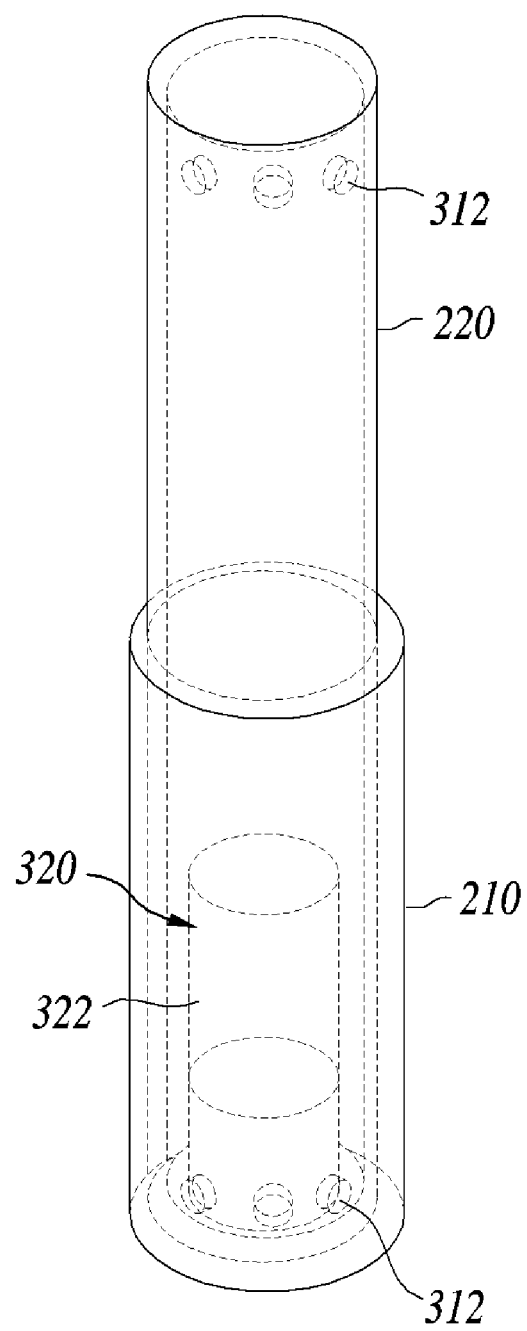

FIGS. 4A and 4B are perspective views of the passive safety device in the normal operation 4A and in the transient state operation 4B due to an excessive rise of the coolant temperature. As shown in FIG. 4A, the density of the buoyancy providing part 320 including the neutron absorber 322 is less than the coolant density in the nominal state operation of the reactor in the state where the coolant flows into the coolant inflow/outflow holes 312, so that the buoyancy providing part floats to the upper part of the passive safety device guide tube 220 inserted in the guide thimble 210. As shown in FIG. 4B, when the temperature of the coolant rises due to the transient state operation of the reactor, the buoyancy providing part is sinking to the lower part of the passive safety device guide tube.

According to an embodiment of the present invention, the buoyancy providing part can include a neutron absorber-containing part and a buoyancy providing material-containing part.

In a preferred embodiment of the present invention, the buoyancy providing part can be formed in a can structure as shown in FIG. 4, and may include a neutron absorber-containing part and a buoyancy providing material-containing part in the can structure.

Even though the neutron absorber-containing part and the buoyancy providing material-containing part are not illustrated herein, they are formed separately therein.

As shown in FIG. 4, the neutron absorber-containing part and the buoyancy providing material-containing part can be integrally formed. In FIG. 4, the neutron absorber-containing part is shown as being located above the buoyancy providing material-containing part, but their positions can be switched to each other.

According to an embodiment of the present invention, the buoyancy providing material can be selected from the group consisting of air, helium, and argon. In a preferred embodiment of the present invention, an additional gas can be included as a buoyancy providing material. In one aspect of the present invention, for example, when the buoyancy providing material is air, it means that the inside of the buoyancy providing part is filled with air.

According to an embodiment of the present invention, the neutron absorber can include one of or both of boron and gadolinium.

According to an embodiment of the present invention, the neutron absorber can be porous. In a preferred embodiment of the present invention, as the neutron absorber, for example, a material capable of effectively absorbing neutrons in a fast reactor, such as porous boron carbide ($B_4C$), can be used. When a porous material is used as the neutron absorber, the density of the neutron absorber can be lowered.

According to an embodiment of the present invention, water ($H_2O$) can be included as a coolant. In general, water is basically used as a coolant, and may further include additional components as needed.

According to an embodiment of the present invention, one or more coolant inflow/outflow holes can be formed either or both of the upper part and the lower part of the passive safety device guide tube.

As shown in FIG. 4, according to an example of the present invention, three coolant inflow/outflow holes 312 are formed on the upper part and on the lower part of the passive safety device guide tube respectively.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. A nuclear fuel assembly for a thermal neutron reactor comprising:
   multiple fuel rods;
   multiple guide thimbles arranged between the fuel rods; and
   a passive safety device inserted in at least one guide thimbles,
   wherein the passive safety device comprises:
   a vertically extending passive safety device guide tube coaxially aligned with the guide tube in which it is inserted and having one or more coolant inflow/outflow holes providing coolant flow between an interior and exterior of the passive safety device guide tube; and
   a buoyancy providing part including a neutron absorber in the interior space of the passive safety device guide tube so as to be movable up and down therein.

2. The nuclear fuel assembly for a thermal neutron reactor according to claim 1, wherein a plurality of passive safety devices are provided in a plurality of the multiple guide tubes and the passive safety device guide tubes of the plurality of passive safety devices are connected to one another via passive safety device guide tube connection parts.

3. The nuclear fuel assembly for a thermal neutron reactor according to claim 2, wherein the passive safety device guide tube connection parts are formed on the multiple passive safety device guide tubes above the guide thimbles in which the passive safety devices are inserted.

4. The nuclear fuel assembly for a thermal neutron reactor according to claim 1, wherein a density of the buoyancy providing part containing the neutron absorber is less than coolant density during a nominal state operation of the thermal neutron reactor and is higher than coolant density during a transient state operation of the thermal neutron reactor.

5. The nuclear fuel assembly for a thermal neutron reactor according to claim 1, wherein the buoyancy providing part includes a neutron absorber-containing part and a buoyancy providing material-containing part.

6. The nuclear fuel assembly for a thermal neutron reactor according to claim 5, wherein the buoyancy providing material includes at least one material selected from the group consisting of air, helium, and argon.

7. The nuclear fuel assembly for a thermal neutron reactor according to claim 1, wherein the neutron absorber includes one of or both of boron and gadolinium.

8. The nuclear fuel assembly for a thermal neutron reactor according to claim 1, wherein the neutron absorber is porous.

9. The nuclear fuel assembly for a thermal neutron reactor according to claim 1, wherein water ($H_2O$) is included as a coolant.

10. The nuclear fuel assembly for a thermal neutron reactor according to claim 1, wherein the passive safety device guide tube includes an upper part and a lower part, wherein the coolant inflow/outflow holes are formed at either or both of the upper part and the lower part of the passive safety device guide tube.

11. The nuclear fuel assembly for a thermal neutron reactor according to claim 1, further comprising control rods inserted any of the multiple guide thimbles not having a passive safety device inserted therein.

* * * * *